(12) United States Patent
Pickering

(10) Patent No.: US 10,447,857 B2
(45) Date of Patent: Oct. 15, 2019

(54) METHOD AND APPARATUS FOR OPERATING A CONTACT CENTER SYSTEM

(75) Inventor: Richard Pickering, Torquay (GB)

(73) Assignee: NEWVOICEMEDIA LIMITED, Hampshire (GB)

( * ) Notice: Subject to any disclaimer, the term of this patent is extended or adjusted under 35 U.S.C. 154(b) by 0 days.

(21) Appl. No.: 13/226,342

(22) Filed: Sep. 6, 2011

(65) Prior Publication Data

US 2012/0066175 A1  Mar. 15, 2012

Related U.S. Application Data

(63) Continuation-in-part of application No. 12/444,115, filed as application No. PCT/GB2007/003728 on Oct. 2, 2007.

(30) Foreign Application Priority Data

Oct. 3, 2006 (GB) .................................. 0619520.0

(51) Int. Cl.
| | |
|---|---|
| *G06F 17/30* | (2006.01) |
| *H04M 3/51* | (2006.01) |
| *G06F 16/31* | (2019.01) |
| *G06F 16/40* | (2019.01) |

(52) U.S. Cl.
CPC .......... *H04M 3/5191* (2013.01); *G06F 16/31* (2019.01); *G06F 16/40* (2019.01)

(58) Field of Classification Search
CPC ....... H04M 3/5191; G06F 16/31; G06F 16/40
See application file for complete search history.

(56) References Cited

U.S. PATENT DOCUMENTS

| | | | |
|---|---|---|---|
| 2,656,609 A | 10/1953 | Siggson | |
| 6,014,647 A | 1/2000 | Nizzari | |
| 7,873,534 B2* | 1/2011 | Simons et al. | 705/7.29 |
| 2003/0231747 A1 | 12/2003 | Creamer | |
| 2004/0081183 A1* | 4/2004 | Monza et al. | 370/412 |
| 2004/0083281 A1* | 4/2004 | Makagon | G06F 9/546 709/223 |
| 2004/0125939 A1 | 7/2004 | Drobek | |
| 2004/0162724 A1 | 8/2004 | Hill et al. | |

(Continued)

FOREIGN PATENT DOCUMENTS

| | | |
|---|---|---|
| EP | 1241596 A2 | 9/2002 |
| EP | 1478155 A2 | 11/2004 |

(Continued)

*Primary Examiner* — Paul Kim
(74) *Attorney, Agent, or Firm* — Galvin Patent Law LLC; Brian R. Galvin

(57) ABSTRACT

One embodiment of the invention provides a method of operating a multimedia contact center. The method comprises providing multimedia communications session management support for a plurality of customers. Each customer maintains customer relationship management (CRM) data. The CRM data is uploaded from the plurality of customers into a multimedia database. The uploading includes transforming the CRM data from an original format maintained by the respective customer into a standardized format for the multimedia database. Communications sessions can then be handled using the transformed CRM data in the multimedia database.

9 Claims, 4 Drawing Sheets

(56) References Cited

U.S. PATENT DOCUMENTS

| | | |
|---|---|---|
| 2006/0056609 A1 | 3/2006 | Dickey |
| 2010/0202603 A1 | 8/2010 | Pickering |

FOREIGN PATENT DOCUMENTS

| | | |
|---|---|---|
| EP | 1684192 A1 | 7/2006 |
| GB | 2439363 A | 12/2007 |
| JP | 2006180028 A1 | 6/2006 |
| WO | 1997038519 A1 | 10/1997 |
| WO | 1999017517 A1 | 4/1999 |
| WO | 2006060579 A2 | 6/2006 |

\* cited by examiner

METHOD AND APPARATUS FOR OPERATING A CONTACT CENTER SYSTEM

CROSS-REFERENCE TO RELATED APPLICATIONS

The present invention is a continuation-in-part of U.S. patent application Ser. No. 12/444,115, titled "METHOD AND SYSTEM FOR OPERATING A COMPUTER-TELEPHONY SYSTEM", filed on Apr. 2, 2009, which is the national stage entry of and claims priority to PCT application serial number PCT/GB2007/003728, with the same title, filed on Oct. 2, 2007. The disclosure of each of the above-referenced patent applications is hereby incorporated by reference in its entirety.

BACKGROUND OF THE INVENTION

1. Field of the Invention

The invention relates to a method and apparatus for operating a contact center system, in particular in a service provider environment.

2. Discussion of the State of the Art

FIG. 1 is an illustration of conventional computer-telephony integration 15 (CTI) system. A switch 90 receives an incoming call 60. The switch passes information about the call to a CTI server 80. The information passed may include, for example, a calling line identification (CLI), sometimes known as automatic number identification (ANI), and/or a dialed number identification. Switch 90 is also provided with an interactive voice response (IVR) unit 95 which may be used to obtain additional information from the caller, for example an account number or such like. This additional information may also be passed to CTI server 80. In some implementations, various messages may be played to the caller as part of the initial call handling, for example to allow a caller to specify the type of desired action, for example to make a new booking, amend a previous booking, or some other query. Caller input 25 in response to this information can then be used subsequently in determining how to handle the call.

Switch 90 routes the call through telephone network 101 to a telephone 121 belonging to an agent 120. For example, switch 90 may route a particular incoming call 60 to agent 120B having telephone 121B. CTI server 80 may instruct switch 90 which particular agent to forward the incoming call to. In other implementations, switch 90 may make this decision through some other mechanism, such as agent availability (and notify CTI server 80 accordingly).

In addition to telephone 121, each agent 120 is also provided with a workstation 122. CTI server 80 has access to a customer relationship management (CRM) database 70. CTI server 80 can use information about a particular call provided by switch 90 to look up information relating to the caller in CRM database 70. For example, this information may represent a name and address of a party associated with a particular calling line identification, as well as any information about previous orders that this person may have made, and so on. CTI server 80 can then provide this information to workstation 122 associated with agent 120 who receives the call in order to assist the agent in handling the caller. For example if the incoming call 60 is to be routed to telephone 121B of agent 120B, then CTI server accesses information about the caller from CRM database 70 and forwards this information to corresponding workstation 122B.

If no agent is free to handle incoming call 60, switch 90 may put the caller in a queue. While the caller is in a queue, switch 90 may provide the caller with marketing messages, information about queue status, and so on. These messages may be sourced from IVR 95 or switch 90 itself.

In some circumstances, a call may be handled automatically without having to reach an agent 120. For example, a caller may ring to obtain an account balance. IVR system 95 may be able to obtain the account number from the caller, perform appropriate security checks (for example, accepting an input PIN), access one or more account balances from a server 201 via a link (not shown) between IVR 95 and computer network 102, and then provide relevant balances to the caller, for example by using text-to-speech systems well-known in the art.

Call centers having CTI such as shown in FIG. 1 have been around for many years. In many cases systems such as the one shown in FIG. 1 are internal to a particular organization. In other words, switch 90 represents a PBX and telephone network 101 represents an internal telephone network of the organization. Likewise computer network 102 represents an internal computer network (such as an intranet) of the organization.

It is also very common for organizations to outsource CTI and/or call center operations to some third party. This strategy may be adopted by very small organizations, which may for example only have one incoming telephone line, as well as by larger organizations. In such cases, referring to the architecture of FIG. 1, switch 90 may be located within a public switched telephony network (PSTN); that is, telephone network 101 may be part of a PSTN Likewise computer network 102 may be the Internet or some other public computer network.

One problem with this third party call center model concerns the provision of access for a CTI service provider to CRM databases 70 of clients (i.e. the organization for whom the hosted telephony service is being provided). For example, CTI server 80 may now have to support access to potentially multiple different CRM database formats for multiple different clients, adding significantly to the cost and complexity of CTI server 80 itself.

SUMMARY OF THE INVENTION

Accordingly, one preferred embodiment of the invention provides a method of operating a multimedia contact center. The method comprises providing support for managing communications sessions of a plurality of media types for a plurality of customers, wherein each customer maintains customer relationship management (CRM) data. CRM data from each customer is uploaded into a multimedia database. This uploading includes transforming the CRM data from an original format maintained by the respective customer into a standardized format for the multimedia database. The system subsequently handles communications sessions using the transformed CRM data in the multimedia database.

Such an approach allows communications sessions of different media types and for different customers to be supported using particular CRM data appropriate for that particular media type and customer. The CRM data for all the different customers is transformed from one or more original or native formats (as maintained by customers themselves) into one or more standardized formats used by a service provider serving many customers. In this manner, the multimedia contact center avoids the complexities of having to provide direct support for multiple different CRM data formats. This approach is particularly helpful in a service provider environment, where the native CRM data is likely to be heterogeneous (each customer potentially adopting a different format for its own CRM data).

In one embodiment, the multimedia database further includes a configuration database describing the CRM data. The transforming may be performed in accordance with information in the configuration database. In one particular embodiment, the configuration database includes a web interface, and wherein the information in the configuration database can be provided or modified via the web interface. The web interface allows customers to update the configuration information themselves. Accordingly, if a customer changes the format of their CRM data, they can make a corresponding update to their configuration information to reflect this change. This facility therefore avoids the service provider itself having to make any updates to the format of the stored CRM data in the multimedia contact center.

In one embodiment, one or more script questions can be uploaded into the multimedia database, for example via the web interface. These script questions can then used in the handling of communications sessions. For example, a script question from the database can be displayed on the screen of an agent who is handling a session. The agent then reads the question out to the consumer, and the response from the consumer may be entered via the screen for capture into a database (if so desired). This facility makes it easy and quick for customers to develop and upload their own applications to run in a multimedia contact center, since the script questions for use in the application are treated in effect as another form of data (along with the CRM data) to upload and store into the multimedia database.

In one embodiment, the uploaded CRM data includes spreadsheet data. Thus some customers, particularly smaller organizations, may not maintain their own CRM database, but rather may employ some simpler facility, such as a spreadsheet, for holding customer data. The spreadsheet data can be imported into the computer-telephony database. Accordingly, the multimedia contact center is very flexible and supports a wide range of different customer data formats (rather than trying to impose a predetermined data format onto customers).

In one embodiment, the method further comprises providing a session database. Information about communications sessions handled by a multimedia contact center is stored into a session database. Stored information about handling of a previous communications session can be used to determine the handling of a current session, either by the multimedia contact center itself, and/or by an agent to whom the session is allocated for processing.

Another embodiment of the invention provides a multimedia contact center system for providing support for handling communications sessions in a plurality of media types and for a plurality of customers. Each customer maintains customer relationship management (CRM) data. The system comprises a multimedia database for storing CRM data from different customers in a standardized format The system further comprises an upload mechanism for uploading CRM data from the plurality of customers into the multimedia database. This uploading includes transforming the CRM data from an original format maintained by the respective customer into the standardized format for the multimedia database. The system is configured to handle communications sessions using the transformed CRM data in the multimedia database.

The handling of communications sessions using the transformed CRM data in the multimedia database can involve one or more of a wide variety of machine operations. Such machine operations may include, for example, automatically forwarding a session to a particular agent or to a particular queue, giving a session a higher or lower priority within a queue, delivering one or more predetermined messages (for example, pre-recorded audio messages, predetermined email auto-response messages, standard frequently-asked-question or FAQ-style instant messages, and so forth) to a consumer, displaying certain information on a computer screen of an agent to whom a session is being forwarded, and so on.

BRIEF DESCRIPTION OF THE DRAWING FIGURES

Various embodiments of the invention will now be described in detail by way of example only with reference to the following drawings.

DETAILED DESCRIPTION

Figure 1:
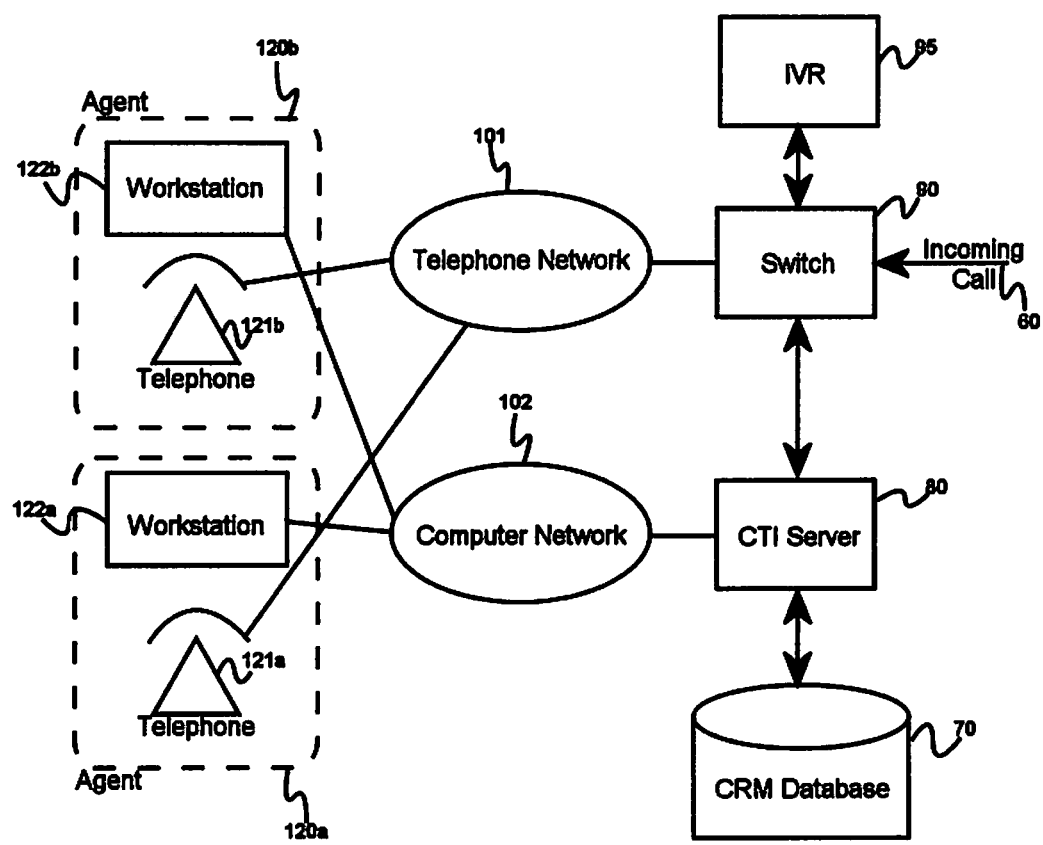
FIG. 1 is a schematic diagram of a known CTI system.
Figure 2:
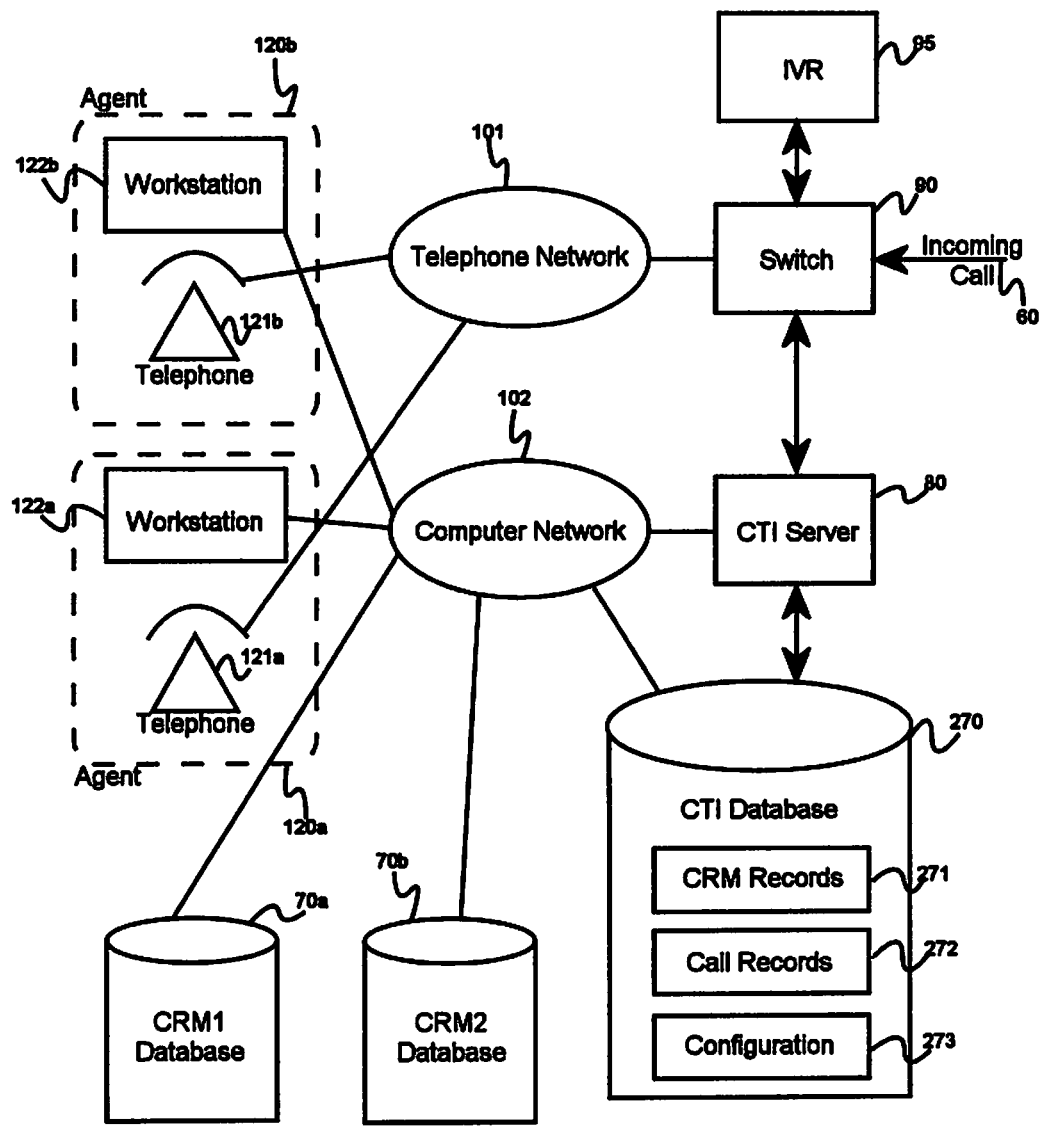
FIG. 2 is a schematic diagram of a CTI system in accordance with one embodiment of the invention.

FIG. 2 is an illustration of a CTI system in accordance with one embodiment of the invention. Components that are the same as existing systems such as shown in FIG. 1 will not be described further. In the system of FIG. 2, CTI server 80 operates in a service provider environment (SPE), in which a service provider has various customers, generally businesses or other organizations. Service providers, which may be telephone network operators or some third party, handle incoming calls for customers.

The system of FIG. 2 includes CTI database 270, which generally contains at least three separate groupings of records, namely CRM records 271, call records 272, and configuration records 273. Although CTI database 270 is shown in FIG. 2 as a single database, it may be implemented across multiple physical systems according to particular needs of any given installation. CTI server 80 interacts with CTI database 270 to handle incoming calls 60. A service provider typically runs CTI server 80 and CTI database 270.

CRM records in CTI database 270 are uploaded from CRM databases of various customers of a service provider. For example, a service provider may have a first customer that maintains a CRM database CRM1, 70A, and a second customer that maintains a CRM database CRM2, 70B. It will be appreciated that although FIG. 2 depicts only two customer CRM databases, in practice a service provider may support CRM databases from a larger number of customers, or indeed even just one customer (with one or more CRM databases), without departing from the scope of the invention as claimed.

Furthermore, CRM records 271 in CTI database 270 will generally be segregated by customer. In other words, CRM records 271 from CRM database 70A are normally (but not necessarily) maintained in a separate table, database or data structure from CRM records from CRM database 70B. CTI database 270 therefore represents a multitenant network database, in that it contains data from multiple different customers (tenants) that is provided to (and from) the database over network 102.

The uploading operation may be performed, for example, by import/export using comma separated variable (CSV) data, a simple object access protocol (SOAP) interface, or any other suitable mechanism. A different upload mechanism may be used with different CRM databases 70A, 70B, etc. A CRM record 271 that has been updated following an incoming call 60 may then be downloaded back to the corresponding CRM database 70. The timing of uploads and downloads can be arranged as required. For example, data transfer (synchronization) operations may be performed each night, or may occur on an ongoing basis during the day.

There are various reasons why CTI server 80 does not use customer CRM databases 70A, 70B, etc. directly. One of these is that a CRM database generally contains sensitive information. A customer may upload only selected information from a CRM database 70 into CRM records 271, so that the service provider hosting CTI database 271 does not have access to all information in CRM database 70 (but rather only such information as is necessary for call handling). In addition, since CTI server 80 utilizes a copy of (some portion or all of) CRM database 70, a customer avoids risks associated with CTI server 80 corrupting or otherwise damaging a customer's main CRM database 70. A further issue is that CTI server 80 has to be able to handle an incoming call 60 substantially in real-time. By maintaining its own copy of CRM records 271 in CTI database 270, CTI service provider can obtain much better control of response times to access CTI database 270. For example, if a CTI service provider had to access CRM database 70A, or 70B in real-time, there might be delays due to bandwidth issues, or perhaps because one or more customers was performing some maintenance or upgrade on the associated customer's CRM database 70.

CTI database 270 also maintains a set of call records 272. Thus details of each incoming call 60 are stored in CTI database 270 as part of the call records. Information stored in call records 272 may comprise data such as date and time, dialed number and CLI, length of time in queue, agents who handled the call, plus information acquired by agents and/or an IVR, such as account number, etc. This information can then be used in determining how to handle or process the call, whether by CTI server 80 and/or by an agent who receives the call. For example, a CLI for a new incoming call may correspond to an earlier call listed in call records 272 that was not completed due to the unavailability of an agent at that time. CTI server 80 may respond to this circumstance by giving the new incoming call a relatively high priority. CTI server 80 may also opt to forward the call to an agent who has previously handled a call having the same CLI. An agent who is handling a call may also access call records 272 to better understand the history between a particular caller and the agent's organization.

CTI database 270 further includes configuration records 273. Configuration records 273 allow a customer to specify a structure of CRM records 271. Thus one of the difficulties for a service provider is that it has to deal with potentially multiple different CRM databases 70A, 70B, etc., each of which may have its own format, configuration, and the like, for storing data. In known systems, CTI server 80 has generally interacted either directly with these different CRM databases 70, or with copies of different CRM databases 70. However, in embodiments such as that shown in FIG. 2, CRM records 271 are not merely a straight copy of data from CRM databases 70A, 70B, but rather represent a reformatting and re-configuration of the data into a single consistent structure. In other words, when data is imported into CTI database 270, it is transformed from a native format of CRM database 70A, 70B, or whatever, into a format specified by CTI database 270.

As an example, one CRM database 70A may store a telephone number as a character string, while another CRM database 70B may store a telephone number as an integer. Likewise, one CRM database 70A may store a telephone number as two separate fields, one field representing the area code and the other field the remainder of the telephone number, while another CRM database 70B may store a telephone number as a single overall field. A single consistent format is specified for CTI database 270, for example, a single field containing a character string. Accordingly, an upload process from database 70A would combine the character strings from the two fields to produce a single field to store in CRM records 271, while an upload process from database 70B would convert the numerical digit string for the telephone number into a character string to store in CRM records 271. Applications running on CTI server 80 would then be designed to work with telephone numbers as a single character string, without having to worry about other possible formats.

The CTI database 270 can also impose consistent terminology on data fields. For example, CRM database 70A may store a "work telephone" and a "home telephone", while CRM database 70B may store a "day telephone" and an "evening telephone". CTI database 270 might adopt the latter terminology, so that "work telephone" and a "home telephone" from CRM database 70A would be mapped to "day telephone" and an "evening telephone" respectively in CRM records 271 during the import process.

One benefit of the above approach is that data in CTI database 270 has a single consistent format irrespective of which CRM database 70 it originates from. This makes it much quicker and more efficient to develop applications on CTI server 80, since existing applications for one customer can be readily modified to work for another customer, without having to worry about data compatibility issues. Furthermore, shared applications do not have to worry about performing data conversions for input/output data, which again improves efficiency.

Another benefit of the consistent structure of CRM records 271 is that it supports customers (typically smaller organizations) that may not maintain their own CRM database 70. For example, such customers may maintain a listing of their clients in a spreadsheet, a word processing document, and so on. The data from such files can be imported into CTI database 270 as part of CRM records 271 for use in call handling on behalf of that customer. Conversely, any data obtained by CTI server 80 as a result of processing a telephone call may be exported back to a customer (e.g. from CTI database 270) in various forms, such as a spreadsheet. It can be seen therefore hat the computer-telephony system of the present invention is very flexible and can support a wide range of customer data formats. In fact, one having ordinary skill the art will readily recognize that data can be imported, with suitable transformation rules, from any customer-based data source whose structure is known (or knowable) to one or more persons tasked with setting up configuration rules to specify required transformations. In addition to conventional relational database, spreadsheets, and word processing documents, potential data import sources comprise (but are not limited to) simplified database systems such as Microsoft Access™, comma-separated values (CSV) files, Mathematica™ or other mathematics program notebook files, portable document format (pdf) files, and any number of variants of the extensible markup language (XML), such as BPXML, SCXML, VXML, and the like. It should be understood that the scope of the invention as conceived by the inventors does not depend on any particular choice of data source from which to import and transform customer relationship data records 271.

Although CTI database 270 imposes a consistent format on CRM records 271, it will be appreciated that records for different customers may contain different fields. For example, a customer who runs an insurance firm may maintain information concerning a next renewal date for some of its clients. CTI database 270 may specify that this date information conforms to a standardized format for all dates in CRM records 271. However, CRM records 271 for other customers, for example for a pizza ordering service, would not have a field corresponding to next renewal date. Thus CTI database 270 ensures a consistent format to the data stored in CTI database 270 across all customers, but data content contained in CTI database 270 may vary from one customer to another.

Configuration database 273 is used to specify the mapping or transformation from the native or original data format in a customer CRM database 70 into the standardized format of CRM records 271. This includes specifying the fields and data structures of CRM records 271. Accordingly, configuration information 273 is used by upload processes to import data from a customer CRM database 70 into CTI database 270. Configuration database may also be used by applications running on CTI server 80 in order to access and manipulate CRM records 271. Note that stored configuration information 273 is generally different for each customer, to reflect different formats and content of data stored in any given customer CRM database 70A, 70B, as well as particular application needs for any given customer.

In one implementation, configuration database 273 is provided with a web interface. This allows customers themselves to provide or modify data stored in configuration database 273. Accordingly, it may then become a responsibility of a customer rather than a service provider to keep configuration database 273 current. For example, if a customer makes a modification to a structure or format of their CRM database 70, the customer can use a web interface to provide a corresponding update to configuration information 273 in CTI database 270 without any need for direct involvement of a service provider. In some embodiments, automated or partially-automated "wizards" or self-explanatory user interfaces that assist customers in specifying configuration data 273 are used to allow customers with very little technical proficiency to fully or substantially fully configure their own configuration database 273 without having to use or be aware of knowledge of specific data structures or formats. For example, a web-based wizard could walk a client through a process of configuring her "tenant" within a multitenant multimedia contact center by asking the client questions such as "what channels of communications types do you want your customers to be able to use to reach you?" and then, if the user selects email as a channel to make available to the client's customers (among other choices that may also be made, or may be made instead), asking "Please enter an email address you would like your customers to be able to use to query your business", in response to which one or more email addresses are collected from the client user. Multimedia contact center configuration data 273 can then be updated with these email addresses, which may be provided with one or more default configuration options that may be adjusted later by the same or another, possibly more technically adept, client or service provider user. Additionally, in some embodiments one or more selected, preconfigured data formats for common data elements such as dates, addresses, and account numbers may be provided via a web interface to a client user to allow the client to easily select and specify a particular format to be used for that client's data of that type (this obviates the need for a client's non-technical user to have to specify complex data formats in some technical formatting or scripting language).

In one embodiment, a web interface can also be used to upload script questions into CTI database 270. These script questions are then used by an application running on CTI server 80 to provide a screen prompt to an agent 120 handling a call. For example, a customer might upload questions such as "Please tell me your account number" into CTI database 270. An application processing a call retrieves this question and places it onto a workstation screen 122 of an agent 120 handling the call. The agent then enters a response provided by the caller into an appropriate portion or box on workstation screen 122, thereby allowing the application to capture an account number provided by a caller and save it into a CRM record 271 for that caller.

Figure 3:
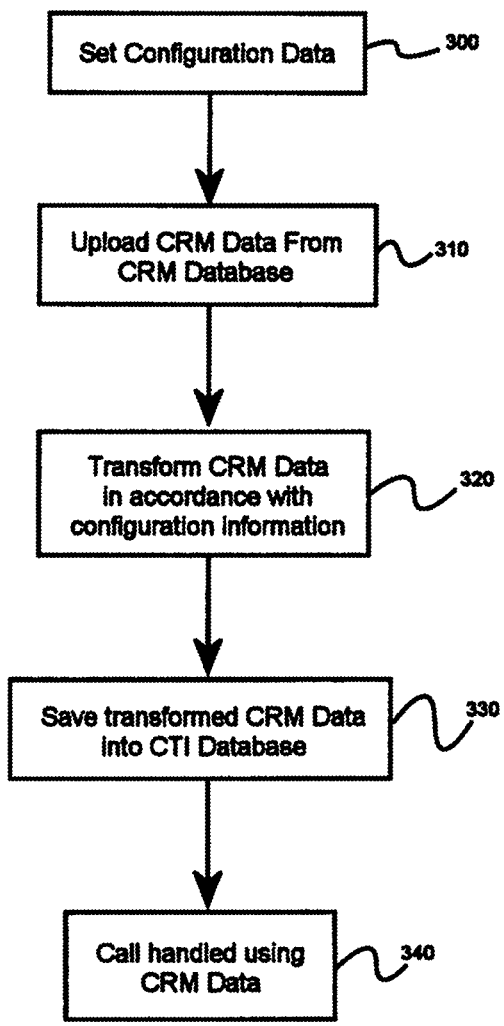
FIG. 3 is a flowchart of a method for operating the CTI system of FIG. 2 in accordance with one embodiment of the invention.

FIG. 3 is a flowchart showing in schematic form the operation of a computer-telephony system of such as that shown in FIG. 2 in accordance with a preferred embodiment of the invention. The flowchart commences with setting of configuration data 273 in CTI database 270 (300). As noted above, CTI database 270 may be provided with a web interface for allowing configuration data 273 to be set by a customer directly (rather than requiring a service provider to do this). Note that although this configuration is depicted in FIG. 3 as a single initial step, it will be appreciated that configuration data 273 may be updated and modified as required during the lifetime of the system (again using the web interface if desired).

CRM data 271 is now uploaded from a customer CRM database 70 (310) to CTI database (310). As previously mentioned, this upload can be performed according to any desired time schedule, for example on a nightly basis, or possibly after any significant update of a customer CRM database 70A, 70B. Note that only selected portions of data in CRM database 70 may be uploaded to CTI database 270, depending upon particular needs of application(s) running for the associated customer on CTI server 80.

As part of the upload, CRM data 271 is transformed from a format native to the CRM database 70 for that particular customer into a standardized format for CTI database 270 (320), and the transformed data is then saved into CTI database 270 (330). The transformation is performed in accordance with stored configuration information 273 for that particular customer. As a result of this transformation, CRM data 271 from various customers is maintained in a common and consistent format within CTI database 270 (although CRM records 271 may be segregated by customer within CTI database 270 for security reasons). This common format greatly assists programming and application development for CTI server 80.

Subsequently, a call can then be handled using saved CRM data (340). For example, saved CRM data may be used to give a priority rating to the call, or to direct the call to a particular agent. The agent receiving the call may also use CRM data 271 for determining how to handle the call. Depending upon the particular application involved, the call may also result in CRM data 271 being updated (not shown in FIG. 3). This updating can then lead to updated CRM records' 271 (for that client or customer at least) being downloaded to CRM database 70 for that particular customer to allow their client records to be kept up to date (this downloading may also be based on the configuration information 273).

Figure 4:
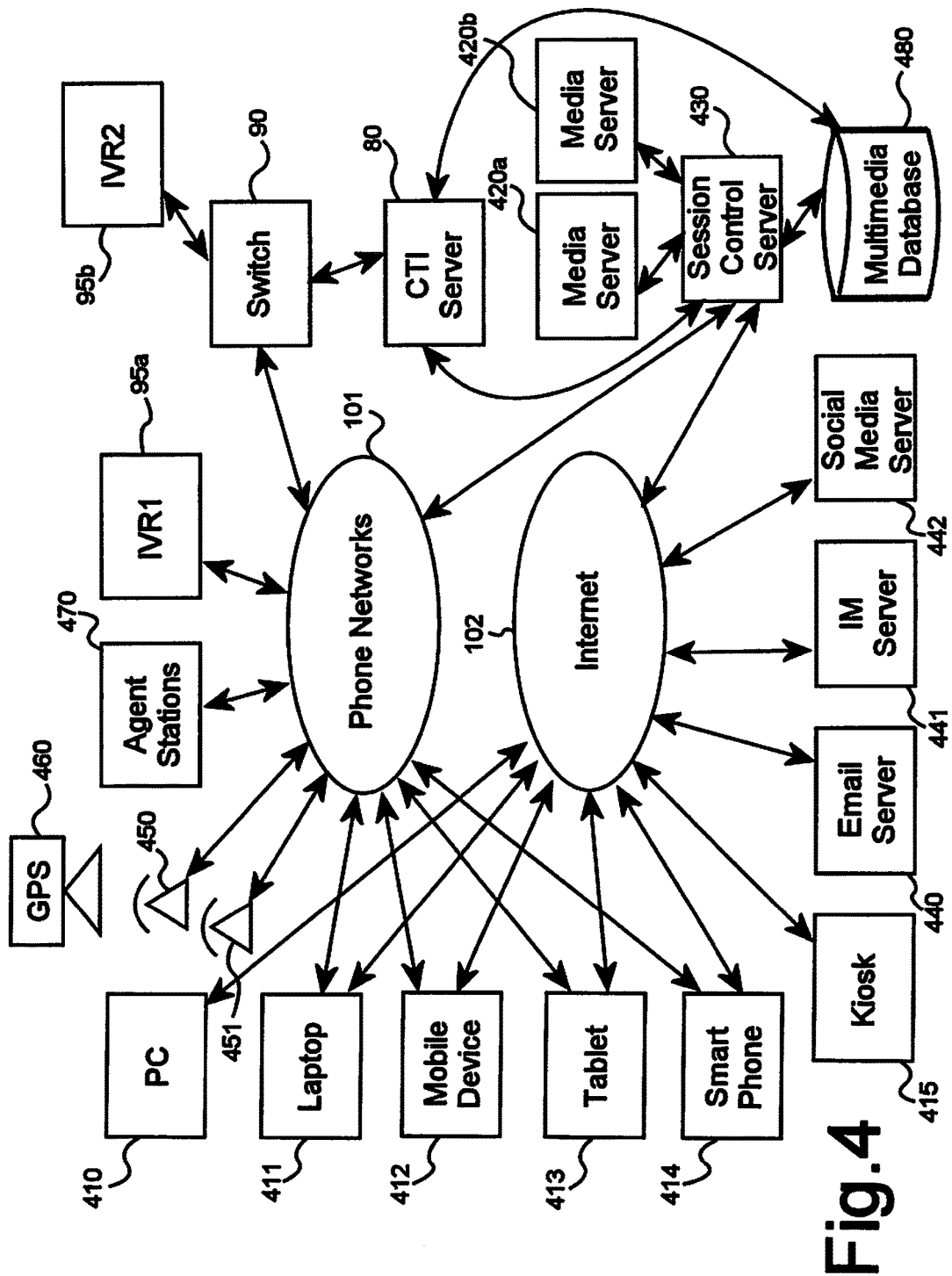
FIG. 4 is a block diagram of a preferred embodiment of the invention in which multiple media types are handled by a contact center using the invention.

FIG. 4 illustrates a preferred embodiment of the invention in which a plurality of media types are handled in a contact center system using improvements conceived by the inventors. Consumers or other person wishing to interact with an enterprise operating a multimedia contact center can initiate a communications session (or receive an enterprise-initiated communications session) using a variety of communication-enabled devices. For example, in some cases personal computer 410, playing a role analogous to that of workstations 122 (but for a consumer rather than an enterprise contact center agent) in previously described embodiments, may be associated with a telephone 450 (analogous to telephones 121), and a consumer may, as before, contact or be contacted by an enterprise via a phone call to telephone 450, the phone call being carried by one or more telephone networks 101. In other cases, a consumer may use PC 410 to initiate or receive a voice-over-Internet-protocol (VoIP) phone call using a software application running on (or accessed via a browser application on) PC 410. In yet other cases, a consumer may participate in a communications session with an enterprise using instant messaging, using one of many instant messaging applications known in the art (such as Microsoft's Office Communicator or AOL™ Instant Messenger; it will be appreciated by one having ordinary skill in the art that there are many instant messaging systems well established in the art, many of which are interoperable using standards such as extensible messaging and presence protocol XMPP). One or more instant messaging servers 441, generally accessible via the Internet but possibly via other data networks, act as intermediaries for instant messaging communications, in much the same way that email servers 440 act as intermediaries for electronic mail (email). Also, it will be appreciated that consumers may choose to interact via asynchronous communications means such as emails (using one or more email servers 440) with an enterprise's multimedia contact center (indeed, the term "multimedia" when used in conjunction with terms such as "contact center" generally refers to contact centers that are adapted to allow consumers to participate in inbound or outbound communications sessions using any of, for example, email, TDM or conventional telephony, IP or Internet telephony, SMS (short message system) messaging, instant messaging, email, chat, or even video communications means). It will be appreciated by one having ordinary skill in the art of communications that consumers can use any of these using software executing on PC 410 or using telephone 450 (for conducting conventional telephony). Similarly, consumers may use laptop 421, again with or without telephone 451, as an endpoint of one or more communications sessions with an enterprise. In yet other cases, consumers may elect to communicate with (or about) an enterprise using newer communications media, such as social media (such as TWITTER™, FACEBOOK™ or GOOGLE+™), which are mediated by one or more social media servers 442 that act as signaling hubs to receive, redirect, and forward communication requests from various participants, again generally but necessarily over the Internet 102.

In addition to personal computer 410 and laptop 411, possibly supplemented by telephones 450, 451, consumers today may use a wide range of highly capable devices as endpoints for communications with enterprise multimedia contact centers. For example, mobile device 412, which could be a personal digital assistant, a "netbook", or even a wristwatch equipped with basic processing capabilities and a wireless radio, may be used as an endpoint. From mobile device 412, a consumer might send or receive emails to or from one or more email servers 440 for further transmission to an enterprise contact center (for instance, when a consumer wishes to find a status of a loan application by sending an email). Alternatively, instant messaging (mediated by one or more instant messaging servers 441) or social media (mediated by one or more social media servers 442), or VoIP telephony over Internet 102 may be used to establish or conduct communications sessions with an enterprise multimedia contact center. Similarly, tablet device 413 (such as Apple's iPad™), smart phones 414 (of which many varieties are well-known in the art), or even kiosks 415, which are generally standalone computers in public locations such as airports or retail outlets that provide at least interconnection capability to visiting consumers, may all be used as endpoints for communications between a consumer and an enterprise multimedia contact center. Moreover, each of these types of devices (and others not shown but that are or become known in the art) is usually capable of supporting more than one particular communications channel or medium, but may not support all possible channels. For instance, a tablet 413 might not be equipped with mobile telephony capabilities and thus not be able to conduct conventional telephony sessions (phone calls), but might be adapted to use VoIP and a public wireless connection to conduct telephony sessions over Internet 102 instead of a telephone network 101. Further, many mobile devices (mobile devices 412, tablets 413, smart phones 414, and even laptops 411) may be equipped with global positioning system (GPS) receiver hardware and software to enable them to receive information pertaining to a present location (or recent set of locations or trajectories) of one or more users of the mobile devices from GPS satellites 460.

The preceding paragraphs have described a wide range of communications channels, media, or modalities that are available to consumers or others (for instance, business partners) seeking to communicate with an enterprise multimedia contact center; it is fair to say that today the number of options is continually expanding, both in terms of underlying technologies (conventional telephony, VoIP telephony, video, instant messaging, email, social media, and so forth), as well as in terms of available providers (instead of one or two phone service providers, consumers now may select from several landline and mobile phone providers, a wide range of freely available email services, and so forth). These capabilities in the hands of consumers have led steadily to the use of more and more communications channels and protocols within enterprise contact centers. Not even fifteen years ago, essentially all contact centers handled one type of medium—conventional telephone calls delivered generally over a single network provider with whom the operator of the contact center had a long-term telecommunications contract—whereas today most contact centers are tasked with responding to (or reaching out to) consumers via most or all of the available communications channels those consumers might adopt.

In order to be able to handle additional media types, enterprise contact centers have become more complex. For instance, and according to a preferred embodiment of the invention, an enterprise multimedia contact center comprises one or more switches 90, sometimes deployed in a third-party hosting facility or within a telephone network, or located in one or more data centers of the enterprise, or collocated with the various contact center sites directly on an enterprise's premises. Since many consumers still choose conventional telephony to communicate with enterprises (and since today it is commonplace in the art to convert a telephone call from one of VoIP and TDM to the other as needed, either in the network or within an enterprise's premises), according to the embodiment one or more interactive voice response (IVR 95a, b) units are used to provide voice-based menus and announcements to consumers, and to accept speech input from consumers. As in the case of embodiments described with reference to FIG. 2, switch 90 is normally connected to CTI server 80, and provides notification of call-related events and updates of call-related data (usually obtained from IVR 95a, b directly, although in some embodiments IVR 95a,b is also connected to CTI server 80 and passes this information directly) to CTI server 80. In addition, as described above, CTI server 80 accesses data from multimedia database 480 to enable intelligent routing of calls and provision of caller-related data to agent workstations 470 (which are typically configured as described with reference to FIGS. 1 and 2, although in embodiments relating to multimedia contact centers, agent workstations 470 are also provided with software for acting as an endpoint (and managing) one or more of the alternative communications media such as IM, email, chat, social media, and video). While some switches 90 known in the art have been extended to become "unified communications servers", many enterprises maintain conventional telephony switches 90 and use one or more media servers 420a, b to manage non-telephony channels (and often to manage VoIP telephony as well). In most embodiments of multimedia contact centers, media servers 420a, b serve to handle low-level media details such as transcoding, encryption, packet collection and ordering, security-related features pertaining to a stream of packets constituting a communications session, handling bridging and conferencing of two or more sessions (analogous to when switch 90 merges two phone calls together or implements a conference bridge). Media servers 420a, b are in many ways analogous in function to switch 90, and in some embodiments there is no switch 90 and all voice communication sessions are either delivered as or converted to VoIP telephony sessions (that is, packetized communications sessions as opposed to circuit-based sessions, which is conventional telephony) and handled by one or more media servers 420a, b. In some cases, specific media servers 420a, b handle only particular media types (for instance, VoIP and IM, but not email), while in others media servers 420a, b are adapted to handle all permissible media types within an enterprise multimedia contact center.

In some embodiments, as described above, one or more IVRs 95a, b may be used to play pre-recorded messages to callers. In addition, in a multimedia contact center, this notion of pre-recorded messages may be extended quite naturally to comprise other forms of automated communications to consumers. Among these are, for example, predetermined email auto-response messages (possibly sent to consumers in response to a particular email subject classification or in response to a recognized query from a consumer such as "what is the status of my refund?"), automatically generated text messages sent via instant messaging server 441 or social media server 442 (or via a telephone network's 101 short messaging system), or automatically selected video clips sent via one or more streaming techniques over the Internet 102. Furthermore according to various embodiments, a number of triggering conditions or causes may be specified that act to trigger or cause the transmittal of one or more automated communications events (such as an automated email, IM, SMS, or video), including but not limited to satisfying a configured business rule based on CRM data 271 contained in multimedia database 470. For example, a periodic query of CRM data 271 in multimedia database 470 can be executed that detects consumers who have applied for a loan and have not yet received an update, or have not received any update in at least a specified period of time such as three days or one week, in order to create a list of consumers (and associated CRM data records 271) to whom one or more automated communications events are transmitted in order to provide the consumers with an update on a status of the consumer's loan application. It should be apparent to one having ordinary skill in the art that, by virtue of having a large amount of relevant consumer-specific data in multimedia database 470, it is possible for a service provider operating a multimedia contact center to provide a high-value proactive notification service to its clients.

In a preferred embodiment, session control server 430 performs a signaling and control function similar to that of CTI server 90, for instance making routing decisions such as to which agent workstation 470 to deliver a particular session or media stream. In some embodiments, session control server 430 implements a protocol known as session initiation protocol (SIP), which is well-known in the art, and which allows it to receive requests for the initiation, routing, termination, bridging, or tagging of communications sessions of any media type. While SIP is a natural and preferred protocol for handling communications with and internal functions of session control server 430, it is not necessary according to the invention, and any suitable call or session control protocol (such as call control XML or CCXML, VoiceXML, or state chart XML or SCXML) can be used alternatively. As was described above with respect to CTI server 80 in a voice call center, either CTI server 80 or session control server 430 may be adapted to retrieve CRM data 271 from multimedia database 480 (which is a generalized version of CTI database 270, as will be described shortly). In addition to functions and data elements already described, in a multimedia contact center additional data elements may optionally be added or may be required in some embodiments. Typically, CRM records 271 will contain more complex data pertaining to contact information for a given consumer, since instead of one or more telephone numbers (commonly for example a home phone, a work phone, and a mobile phone), CRM records 271 may contain email addresses, instant messaging user names associated with one or more instant messaging networks, social media usernames associated with one or more social media networks, and so forth. As it has become common for one or more social media network providers to offer "open security" solutions in which a single social media network may provide account login and authentication services to a wide variety of third party services (generally as a way to increase adoption of the associated social media network), in some embodiments CRM records 271 contain one or more central user identities that can be used to authenticate and login a given consumer into a plurality of third party communications systems and online locations. Similarly, call records 272 are, according to multimedia contact center embodiments of the invention, adapted to capture data relevant to all applicable media types. Since different media types can accommodate very different "call flows" (sometimes referred to or considered as "call topologies" or "call structures"). For example, the word "session" can have very different meanings when used to refer to different communications channels. With phone calls, whether conventional or VoIP-based, a session is understood to mean a phone call or a set of related phone calls that occur substantially simultaneously and are related (for instance, if a consumer calls and is routed to an agent, then the agent holds the consumer and makes a short call to another, more expert, agent, then their will be within switch 90 two "calls", but generally CTI server 80 would consider them to be part of one "session"). In contrast, email "conversations" or "threads" (that is, a sequence of related emails between two or more parties, often over a protracted period of time, that are about one particular topic or transaction) are often considered to comprise a single "session". In the first (phone call) case, all sub-sessions or components of a session occur "at one sitting"—they take place within a single span of time, usually with at least one active throughout the applicable span, such that when the last active call of a given session is terminated, the session is considered terminated, and any new call that might be between the same parties would be considered a new session; in the second case, sessions may be comprised of many sub-sessions or components that occurred over a potentially long period of time. Call records 272 can be maintained, according to the embodiment, either a single table of complex data structures representing each session in whatever way is best suited for its particular media type (note that, in some embodiments, sessions may even be composed of multiple sub-sessions that comprise different media types, in what are known as the art as "multimodal" communications scenarios), or in a set of distinct tables, each designed to handle session records (a generalization of switch 90-derived call records) for a specific media type or group of related media types.

The skilled person will be aware of a range of possible modifications of the various embodiments described above. Accordingly, the present invention is defined by the claims and their equivalents.

What is claimed is:

1. A method of facilitating self-management of consumer relations by a customer of a multimedia contact center system, the method comprising the steps of:
    providing session control support, comprising at least receiving a consumer communication session of a plurality of media types from a customer of a first multimedia contact center at a session control server located in a network facility remotely from a plurality of multimedia contact centers and making information about the consumer communication session available to software applications, using the session control server, to the first multimedia contact center, wherein each of the plurality of multimedia contact centers maintains customer relationship management (CRM) non-program data;
    uploading heterogeneous CRM non-program data from the plurality of multimedia contact centers into a multimedia database component of the network facility resident in the network, wherein the uploading includes transforming the heterogeneous CRM non-program data from an original format maintained by the respective multimedia contact center into a standardized format for the multimedia database;
    generating context-appropriate script questions based on the uploaded heterogenous CRM non-program data that has been transformed into a standardized format and storing the context-appropriate script questions as additional standardized format CRM non-program data;
    handling with the session control server system the consumer communication session for the first multimedia contact center by using the transformed CRM non-program data for the first multimedia contact center in the multimedia database, wherein handling the consumer communication session comprises:
        routing the consumer communication session to an agent of the first multimedia contact center;
        selecting context-appropriate script questions based on the plurality of media types from the communication session;
        presenting the context-appropriate script questions to the agent of the first multimedia contact center for interactions with the consumer.

2. The method of claim 1, wherein said multimedia database further includes a configuration database describing the CRM non-program data.

3. The method of claim 2, wherein said transforming is performed in accordance with information in the configuration database.

4. The method of claim 3, wherein said configuration database includes a web interface, and wherein said information in the configuration database can be provided or modified via the web interface.

5. The method of claim 4, further comprising allowing the customer to upload one or more customized script questions into the multimedia database, wherein said one or more customized script questions are to be used in the handling of consumer communication sessions.

6. The method of claim 4, wherein the uploaded CRM non-program data includes spreadsheet data.

7. The method of claim 4, further comprising providing a session database of the first multimedia contact center, the session database being located remotely from the plurality of multimedia contact centers, wherein information about consumer communication session handled by the multimedia contact center is stored in the session database.

8. The method of claim 4, wherein the web interface allows the customer to create its own customized CRM applications using the CRM non-program data.

9. The method of claim 8, wherein the client's creation of customized CRM applications is facilitated by the use of automated or partially-automated "wizards" or self-explanatory user interfaces that assist customers in specifying configuration data.

* * * * *